No. 663,167. Patented Dec. 4, 1900.
C. M. HALL.
METHOD OF MAKING ALUMINA.
(Application filed May 26, 1900.)
(No Model.)
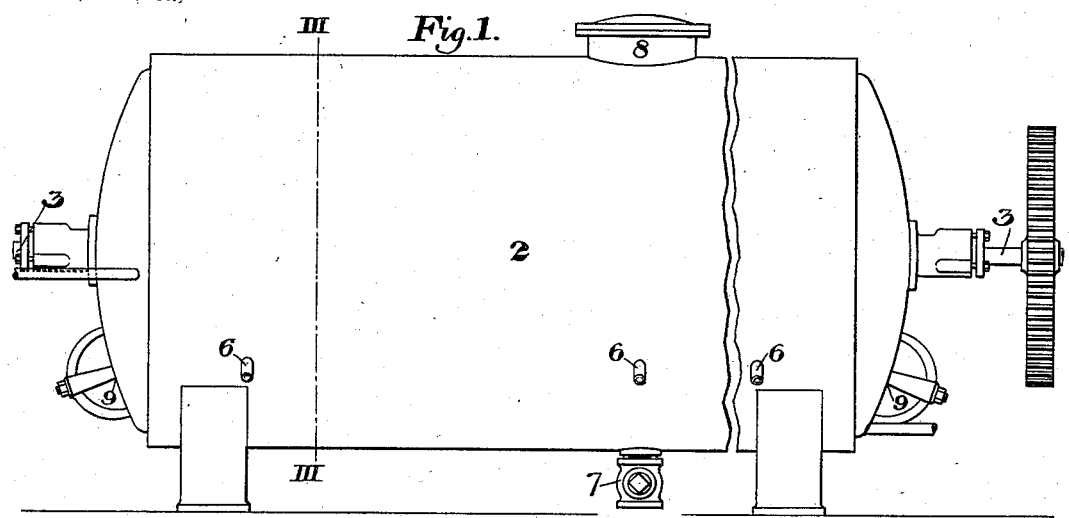
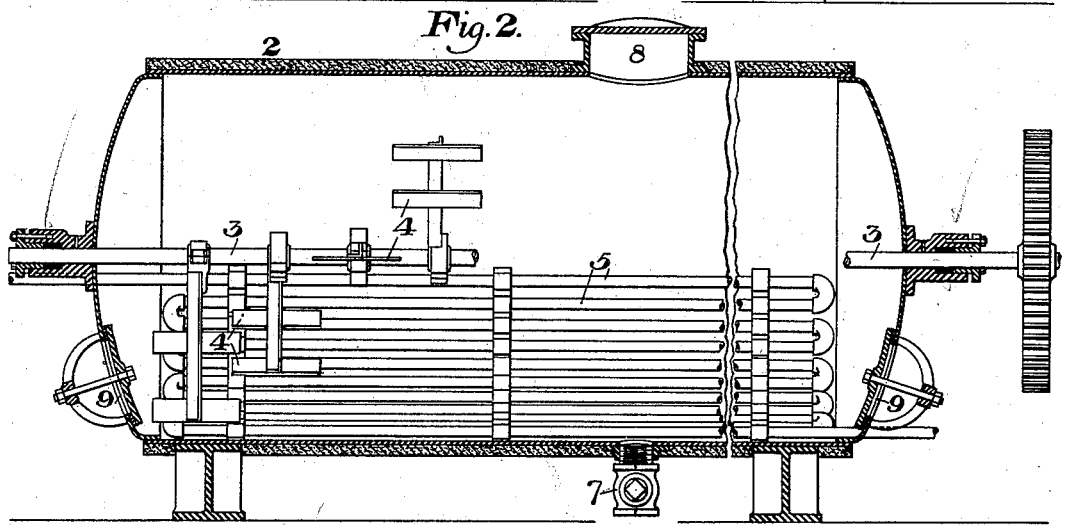
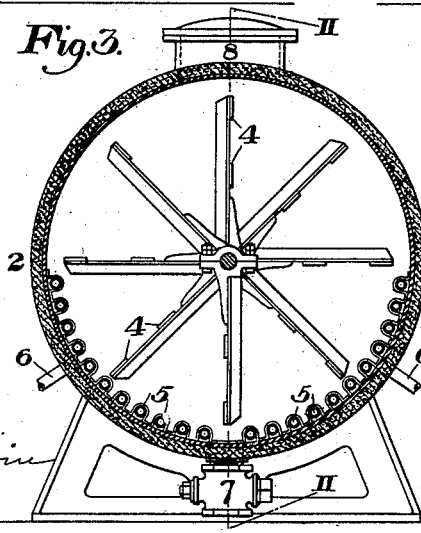
WITNESSES
INVENTOR
Charles M. Hall
by Bakewell & Bakewell
his attys.

UNITED STATES PATENT OFFICE.

CHARLES M. HALL, OF NIAGARA FALLS, NEW YORK.

METHOD OF MAKING ALUMINA.

SPECIFICATION forming part of Letters Patent No. 663,167, dated December 4, 1900.

Application filed May 26, 1900. Serial No. 18,174. (No specimens.)

*To all whom it may concern:*

Be it known that I, CHARLES M. HALL, of Niagara Falls, Niagara county, New York, have invented a new and useful Improvement in the Manufacture of Alumina, of which the following is a full, clear, and exact description, reference being had to the accompanying drawings, in which—

Figure 1 shows in side elevation a digester suitable for the practice of my invention. Fig. 2 is a longitudinal section on the line II II of Fig. 3. Fig. 3 is a vertical cross-section on the line III III of Fig. 1.

In the practice of my invention in its preferred form I take bauxite or impure alumina and preferably calcine it at a low heat for the purpose of burning off the organic matter. I then place in a digester the bauxite, together with burnt lime, carbonate of soda, and water, in such proportions, preferably, that all the lime may be converted into carbonate of lime, the alumina into sodium aluminate, and the silica also combined with the lime, although, as will appear below, the proportions may be varied within wide limits, and as I believe I am the first to use lime in the purification of bauxite in the digester the proportions of materials may be varied without departure from my invention.

Where the partially-calcined bauxite contains seventy-five per cent. of alumina I have found that the following mixture, which is calculated to give two equivalents of soda to one of alumina, gives good results: bauxite, one hundred pounds; burnt lime, containing, say, ninety-five per cent. CaO, one hundred and thirty-three pounds; soda-ash, containing, say, ninety-eight per cent. $NaCO_3$, one hundred and ninety pounds. The soda ash is dissolved in sufficient water to constitute, preferably, a liquor of 20° to 28° Baumé. This will require about seven hundred pounds of water, and the above proportions are calculated to present two to three units of $NaCO_3$ for each unit of $Al_2O_3$ in the bauxite and to present sufficient lime to effect the most thorough conversion of the soda first into caustic soda and ultimately into sodium aluminate. Having placed this mixture in a digester, I subject it to heat at considerable pressure. This may be done by injecting steam, say, at a pressure of one hundred and forty pounds, the mixture first being preferably heated by a steam-jacket or by steam-pipes or by fire heat in order to prevent undue condensation of the steam, or it may be heated by the steam jacket or pipes or fire heat alone. During the heating operation, which is preferably continued from one to three hours, the mixture is agitated by revolving paddles or otherwise. This treatment causes a reaction among the materials of the mixture and produces a solution of sodium aluminate, leaving an insoluble residue containing carbonate of lime, compounds formed by the lime with the silica, and also the inert impurities of the bauxite, such as iron oxid and insoluble alumina. The sodium-aluminate solution is then filtered and the aluminium hydrate precipitated therefrom by carbonic acid or otherwise, leaving carbonate of soda in solution. The solution may then be concentrated to any desired degree and used again with bauxite and lime in the manufacture of another lot of alumina.

In the drawings, 2 represents a digester suitable for the practice of my invention.

3 is a rotary shaft having paddles 4 for agitation of the contents.

5 is a coil of steam-pipes arranged within the digester, through which steam may be passed.

6 6 are steam-jet pipes, by which live steam may be injected.

7 is a blow-off valve.

8 is a charging-hole, and 9 9 are manholes.

An essential part of my invention consists in the use of lime in the digester. Its function is to combine with the carbonic acid of the carbonate of soda and to convert the carbonate of soda into caustic soda and also to combine with the silica. Within my invention I may make use of lime not only where carbonate of soda is charged with the mixture into the digester, as above described, but also in processes in which bauxite is introduced with caustic soda or with the caustic aluminate liquor which results from the precipitation of alumina in the Bayer process. In such processes the mixture always contains a considerable proportion of silica and also some carbonate of soda, either introduced originally as an impurity or formed by exposure of the caustic-soda solution to the air. The silica and carbonate of soda in these processes are both harmful, the carbonate of soda because it decreases the efficiency of the mixture and the silica because it combines with and wastes the caustic soda; but the addition of lime prevents these injurious effects, for the lime decomposes the carbonate of soda, producing therefrom caustic soda, and by combining with the silica prevents the latter from attacking and wasting the soda. The lime also combines with any phosphoric acid which may be present in the mixture and prevents its solution by the soda.

Among the advantages of my invention are that it enables me to employ bauxite containing a greater percentage of silica and other impurities than can be treated economically by other processes of purification, and it affords very complete extraction of the alumina. When the aluminate solution is filtered, the presence of lime as a carbonate is advantageous, because it aids in entangling and separating the fine red mud which contains the undissolved impurities of the bauxite.

By obtaining better filtration, as well as by the efficiency with which silica and other impurities are eliminated, my process affords alumina of a high degree of purity, and this is a matter of importance, especially where the alumina is to be used in the manufacture of aluminium, because the impurities contained in alumina are reduced with the metal and impair its commercial value. I also obtain advantages in respect of cheapness of the apparatus required in my process and in saving of labor and expense resulting from my ability to dispense with the original addition of caustic soda to the mixture.

I claim—

1. In the treatment of aluminous materials with alkaline caustic liquor in a digester for conversion into sodium aluminate, the improvement which consists in adding lime to the mixture under treatment in the digester whereby any carbonate of soda present in the caustic liquor is decomposed, and the silica eliminated; substantially as described.

2. The method herein described for converting aluminous material into sodium aluminate, which consists in treating such material in a digester with carbonate of soda and lime; substantially as described.

3. The method herein described for converting aluminous material into sodium aluminate, which consists in treating such material in a digester with carbonate of soda and lime; the lime being in sufficient proportion to combine with the carbonic acid of the carbonate of soda and with the silica of the aluminous material; substantially as described.

In testimony whereof I have hereunto set my hand.

CHARLES M. HALL.

Witnesses:
 THOMAS W. BAKEWELL,
 H. M. CORWIN.